(12) United States Patent
Wolf

(10) Patent No.: US 7,497,310 B2
(45) Date of Patent: Mar. 3, 2009

(54) FRICTION CLUTCH

(75) Inventor: Andreas Wolf, Tettnang (DE)

(73) Assignee: Linnig Trucktec GmbH, Markdorf (DE)

( * ) Notice: Subject to any disclaimer, the term of this patent is extended or adjusted under 35 U.S.C. 154(b) by 231 days.

(21) Appl. No.: 11/375,596

(22) Filed: Mar. 14, 2006

(65) Prior Publication Data
US 2006/0213743 A1    Sep. 28, 2006

(30) Foreign Application Priority Data
Mar. 24, 2005   (DE) ................. 10 2005 014 347

(51) Int. Cl.
*F16D 27/12* (2006.01)
*F01P 7/08* (2006.01)
(52) U.S. Cl. ............. 192/48.2; 192/84.21; 192/84.31
(58) Field of Classification Search ............ 192/48.2, 192/84.21, 84.3, 84.31, 84.96
See application file for complete search history.

(56) References Cited

U.S. PATENT DOCUMENTS

| | | | |
|---|---|---|---|
| 5,586,636 A * | 12/1996 | Linnig | 192/48.2 |
| 6,013,003 A * | 1/2000 | Boffelli et al. | 475/149 |
| 6,257,386 B1 * | 7/2001 | Saito et al. | 192/48.2 |
| 6,468,163 B1 * | 10/2002 | Boffelli et al. | 464/29 |
| 6,520,304 B2 * | 2/2003 | Bellotti et al. | 192/48.2 |
| 6,598,720 B2 * | 7/2003 | Ritter et al. | 192/48.2 |
| 6,915,887 B2 * | 7/2005 | Faller et al. | 192/48.2 |
| 2005/0155834 A1 * | 7/2005 | Krafft | 192/84.94 |

FOREIGN PATENT DOCUMENTS

| | | |
|---|---|---|
| DE | 197 41 553 A1 | 3/1999 |
| DE | 103 03 183 A1 | 7/2004 |
| DE | 10 2004 027 899 A1 | 2/2005 |
| JP | 07-293594 A1 | 11/1995 |

* cited by examiner

*Primary Examiner*—Charles A Marmor
*Assistant Examiner*—John V Ligerakis
(74) *Attorney, Agent, or Firm*—Burr & Brown

(57) ABSTRACT

A friction clutch for a driven element that is connected directly to a drive by means of a first friction-disk clutch and being capable of being matched to the speed of the drive. When the first friction-disk clutch is disengaged, the drive of the driven element is adjusted to a relatively low take-up speed by means of an eddy-current clutch which can be engaged by means of a second friction-disk clutch. The driven element is arranged on a shaft or axle, so that, when the first and second friction clutches are disengaged, the drive of the driven element can be adjusted to a further take-up speed by means of the friction of a roller bearing. The eddy-current clutch includes an eddy-current part and a permanent magnet part which can be moved relative to the eddy-current part.

7 Claims, 2 Drawing Sheets

FRICTION CLUTCH

FIELD OF THE INVENTION

The invention relates to a friction clutch and to a drive arrangement for a fan impeller of a motor vehicle.

BACKGROUND OF THE INVENTION

In so-called two-stage clutches, a driven element can be driven at a drive speed and also at two different, relatively lower take-up speeds. As a result, three different speed stages can be realized. If the driven element, for example a fan impeller of a motor vehicle, is to rotate at the engine speed, a first friction-disk clutch, for example, is provided, so that the driven element can be driven in a non-positive manner. When the first friction-disk clutch is disengaged, a first take-up speed of the driven element is set by means of a second friction-disk clutch and an eddy-current clutch coupled to the second friction-disk clutch. For a take-up speed which is lower still, both friction-disk clutches are disengaged, the driven element is then moved by means of and together with, for example, a rotating driveshaft due to bearing friction.

The clutches are driven, in particular, by means of a central driveshaft, or for example when there is a fixed axle, by means of a driving pulley.

SUMMARY OF THE INVENTION

The invention is based on the object of providing a friction clutch of the type designated in the introduction which is comparatively more advantageous in both technical and economical terms.

The invention proceeds from a friction clutch for a driven element, in particular for a fan impeller of a motor vehicle, the driven element being connected directly to a drive by means of a first friction-disk clutch and being capable of being adjusted to the speed of the drive. When the first friction-disk clutch is not engaged, the speed of the driven element can be adjusted to a relatively low take-up speed by means of an eddy-current clutch, which can be engaged by means of a second friction-disk clutch. The driven element is arranged on a shaft or axle, so that, when the first and second friction clutches are not engaged, the drive of the driven element can be adjusted to a further take-up speed by means of the friction of a roller bearing. The eddy-current clutch comprises an eddy-current part and a permanent magnet part which can be moved relative to the eddy-current part. A significant aspect of the invention is that, in spatial terms, the permanent magnet part is arranged in the axial direction between the driven element and a driving flange which, when the first friction-disk clutch is engaged, can be connected directly to the driven element. A compact friction clutch of comparatively simple design which makes use of standard bearings can thus be obtained. In particular, a stepped ball bearing, as used in a known embodiment, is no longer required.

A further important aspect of the invention is that the eddy-current part is formed on the side of the driven element. A design which permits simple bearing units is made possible as a result.

This approach is based on the awareness that an eddy-current part can be formed entirely within the driven element without running the risk of cooling problems, even if an outwardly-arranged, driven ribbed disk, which was previously necessary for sufficient cooling and which contained the eddy-current part, is dispensed with. When the ribbed disk is dispensed with a stepped ball bearing, which is necessary for the attachment of the ribbed disk can be omitted.

The eddy-current part formed on the side of the driven element ensures that the dissipation of heat via the constantly rotating driven element is advantageously assisted in all shift stages.

In one advantageous embodiment of the subject matter of the invention, the driven element and the permanent magnet part are each mounted by means of a separate bearing unit at an axial distance. As a result, the driven element and the permanent magnet part can be mounted in an economically advantageous way. On one hand, standard bearing units, for example, can be used which are more cost-effective than so-called stepped or double-ball bearings. In addition, it can be advantageous, for example for service or repair purposes, if the driven element and the permanent magnet part are mounted independently of one another.

One advantageous embodiment of the friction clutch is distinguished in that at least one of the two friction-disk clutches is embodied as a clutch which can be solenoid-operated. Clutches which can be solenoid operated are particularly reliable and are low-lag shift clutches which have, for example, been proven extensively in vehicle construction.

In one advantageous embodiment of the friction clutch according to the invention, at least one of the two friction-disk clutches is embodied as a pneumatic or hydraulic clutch. The friction clutches can in principle be operated in different ways. In particular, the proposed friction clutch can be matched to, or integrated into, existing pneumatic or hydraulic systems.

It is also proposed that the permanent magnet part comprises a flange part which is produced essentially as a casting. A casting, made in particular from aluminum or an aluminum-based material, has for example a relatively low specific weight and high stability values.

In one embodiment, which is, moreover, favorable, of the subject matter of the invention, the driven element alternatively or additionally has a flange part which is embodied essentially as a casting.

BRIEF DESCRIPTION OF THE DRAWINGS

Further features and advantages of the invention are described in more detail on the basis of the schematically illustrated figures, in which.

DETAILED DESCRIPTION OF THE INVENTION

Figure 1:
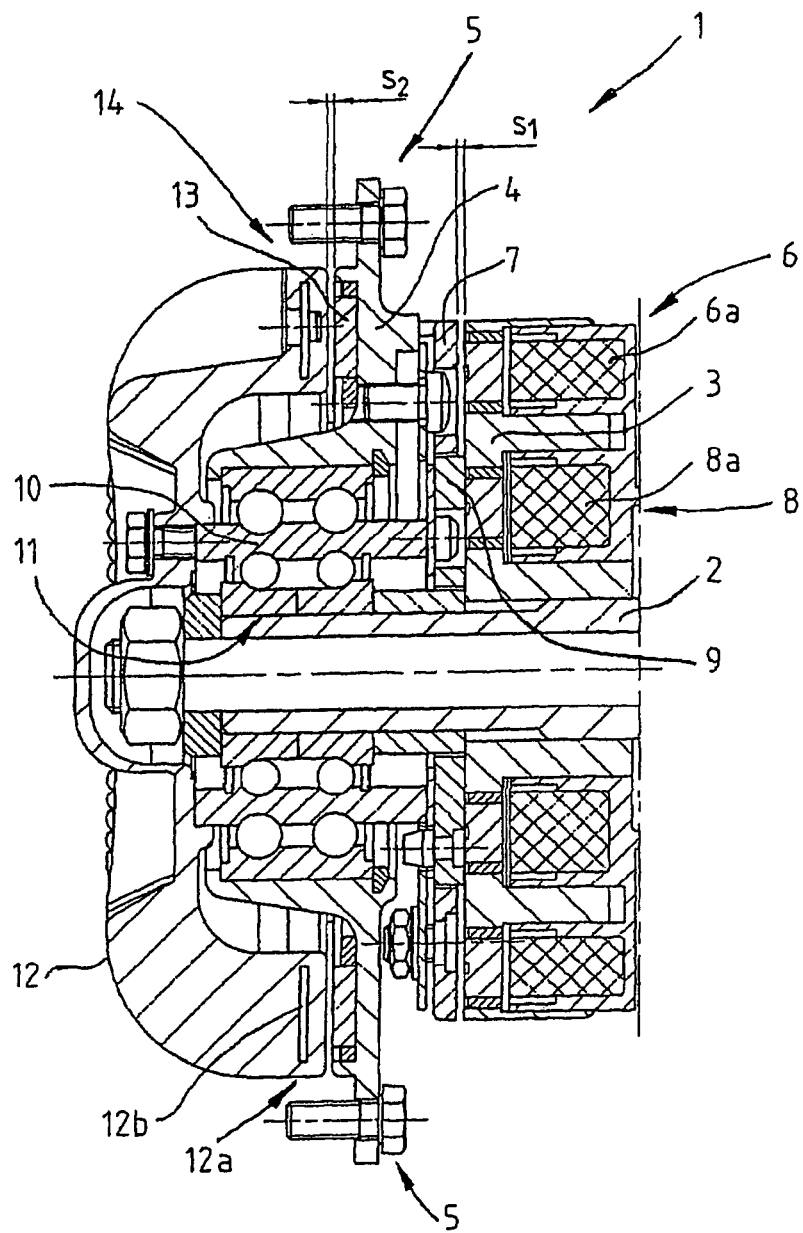
FIG. 1 shows a detail of a known prior art friction-disk clutch, which can be solenoid operated.

FIG. 1 shows a known friction-disk clutch, which can be solenoid-operated and is used, for example, as a fan clutch 1 for a motor vehicle. The fan clutch 1 comprises a driveshaft 2, on which a rotor disk 3 is arranged in a rotationally fixed manner. The drive shaft 2, and thus the rotor disk 3, is brought up to drive speed by means of a drive motor (not illustrated). In addition, a fan impeller hub 4 is rotatably mounted on the driveshaft 2, on to which a fan impeller hub 4 having fan blades (not illustrated) can be screwed, for example by means of screw connections 5.

Three different speed stages of the fan impeller hub 4 can be obtained using the fan clutch 1. If the fan impeller hub 4 is to rotate at the same speed as the driveshaft 2, a first electromagnetic clutch 6 is engaged by supplying current to an associated first electromagnet 6a. This results in a first armature disk 7, which is connected in an axially moveable manner to the fan impeller hub 4, being magnetically pulled toward the rotor disk 3 by magnetic forces. As a result, the driveshaft 2, the rotor disk 3, and the fan impeller hub 4 rotate at the same speed.

When the first electromagnetic clutch 6 is not supplied with current, a relatively low speed, a so-called take-up speed, of the fan impeller hub 4 can be set using a second electromagnetic clutch. For this purpose, a second electromagnet 8a is supplied with current, and a second axially moveable armature disk 9 is pulled toward the rotor disk 3. The armature disk 9 is fixedly screwed to an intermediate ring 10, which is associated with a double-ball bearing 11, and said intermediate ring 10 is fixedly screwed to a ribbed disk 12. The double-ball bearing 11 permits rotatable mounting of the fan impeller hub 4 and the ribbed disk 12. A radially outwardly situated annular region 12a of the ribbed disk 12 is spaced apart by a gap $s_2$ from an annular section of the fan impeller hub 4, to which a plurality of permanent magnets 13, of respectively opposing polarity, are attached in the circumferential direction. The annular region 12a has, for example, an enclosed steel ring 12b. When the second electromagnet 8a is supplied with current, the ribbed disk 12 is adjusted up to the drive speed by means of the rotor disk 3, the second armature disk 9 and the intermediate ring 10, and as a result an eddy-current clutch 14 is activated, so that the fan impeller hub 4 rotates at the first take-up speed.

In order to set a second, lower take-up speed, of the fan impeller hub 4, the first electromagnetic clutch 6 and the second electromagnetic clutch 8 are disengaged, as a result of which the armature disks 7 and 9 are spaced apart from the rotor disk 3 by, for example, the gap $s_1$. The friction, which occurs in the double-ball bearing 11 as the driveshaft 2 rotates, causes the fan impeller wheel 4 to be taken up and rotated at a second take-up speed which is lower than the first take-up speed.

Figure 2:
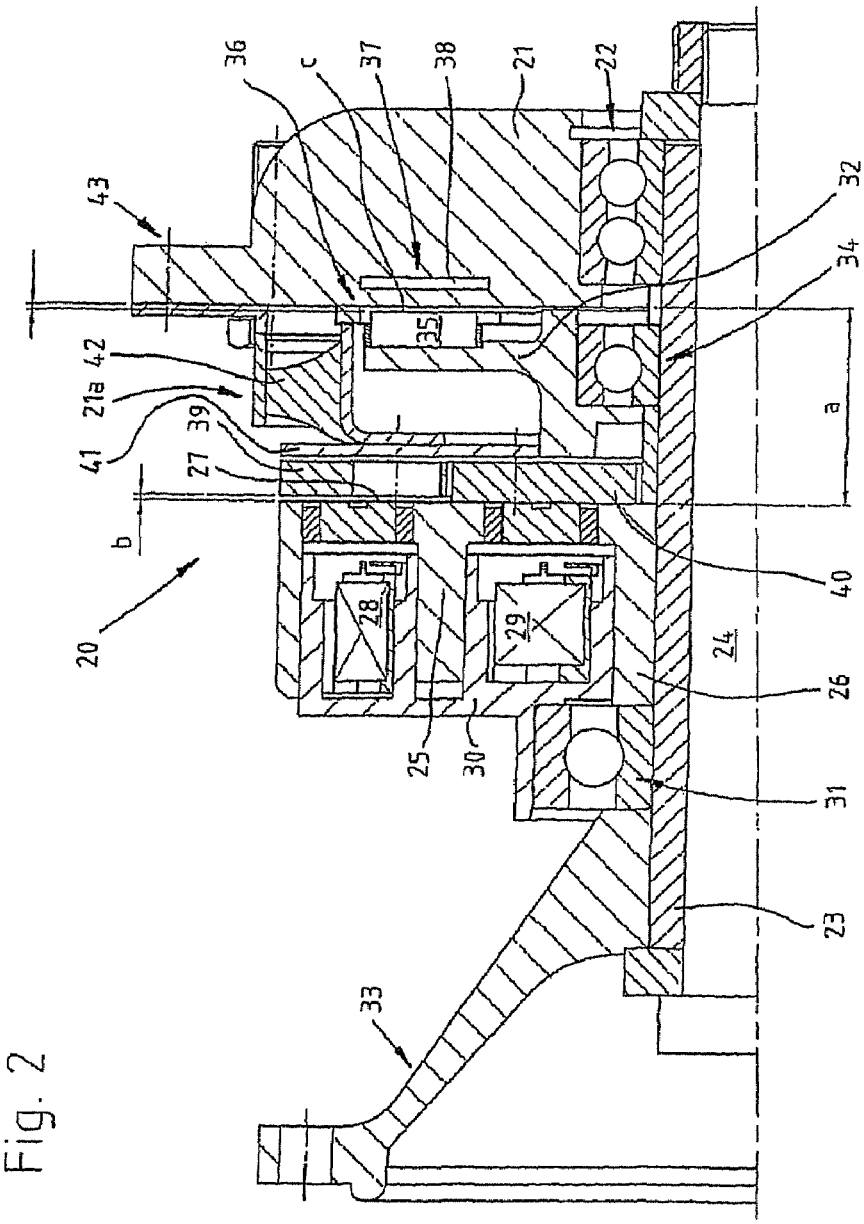
FIG. 2 shows a detail of a friction clutch according to the invention.

FIG. 2 shows a schematic illustration of an arrangement according to the invention having a friction clutch 20 for, for example, a fan impeller of a motor vehicle. A fan impeller hub 21 is mounted, by means of a single-step ball bearing 22 having, for example, two roller body rings, on a driveshaft 23, which is screwed to a screw element 24. In addition, a rotor disk 25 is connected in a rotationally fixed manner to the driveshaft 23 by means of a sleeve section 26. The rotor disk 25 has a friction disk section 27 which runs radially and has friction faces for a friction clutch.

In the region of the rear side, which faces away from the friction disk section 27 of the rotor disk 25, two electromagnets 28, 29 are arranged radially one above the other so as not to contact said rotor disk 25. The two electromagnets 28, 29 are held on a positionally fixed flange piece 30 which is mounted on the driveshaft 23 by means of a further ball bearing 31.

A conically widening flange 33, which is secured axially and serves, for example, to transmit drive forces to the driveshaft 23, is fixedly connected to the driveshaft 23 on that side of the ball bearing 31 which faces away from the clutch arrangement.

A further annular flange 32 is rotatably mounted in the axial direction, by means of a ball bearing 34, on the driveshaft 23 in the region a between the fan impeller 21 and the rotor disk 25. A plurality of permanent magnets 35 are attached to the annular flange 32 in the circumferential direction and have respectively opposing magnetic polarity in an alternating pattern. The permanent magnets 35 are associated with an eddy-current clutch 36 having an eddy-current region 37 in the fan impeller hub 21 which is moveable relative to the annular flange 32. The fan impeller hub 21 is provided with a steel ring 38 in the eddy-current region 37 at the radial height of the permanent magnets 35, which steel ring 38 is, for example, enclosed in the fan impeller hub 21, which is embodied as a casting. The permanent magnets 35 are slightly spaced apart from the fan impeller hub 21 by the distance c.

An armature element 39 is provided connected in an axially moveable manner to the fan impeller hub 21 by means of an intermediate part 21a on that side which faces toward the rotor disk 25. When the first electromagnet 28 is supplied with current, the armature element 39 is magnetically pulled toward the rotor disk 25 and against a radially outer part of the friction disk section 27, so that the fan impeller hub 21 rotates under frictional contact at the same speed as the rotor disk 25. A fan impeller (not illustrated) can also be screwed on to the fan impeller hub 21 in addition to the intermediate part 21a by means of a screw connection 43 which is only indicated schematically.

When the electromagnet 28 is not supplied with current, the armature element 39 is returned axially, or the armature element 39 is spaced apart from the friction disk section 27 by a distance b, by means of a connected elastic return element, for example a spring element 41.

At the same axial height as the armature element 39, but further inward radially, a second armature element 40 is likewise present in an axially moveable fashion on the annular flange 32. If, when the electromagnet 28 is not supplied with current, a second electromagnet 29 is supplied with current, the armature element 40 is placed in frictional engagement with a radially inner part of the friction disk section 27, so that the annular flange 32 rotates at the same speed as the rotor disk 25. Eddy currents are induced in the eddy-current part 37 of the fan impeller hub 21 by means of the permanent magnets 35 which rotate together with said eddy-current part 37, and a torque is transmitted to the fan impeller hub 21 by means of the magnetic fields formed in the process. As a result, when the electromagnet 29 is supplied with current and, at the same time, the electromagnet 28 is not supplied with current, a first take-up speed is transmitted to the fan impeller hub 21. FIG. 2 illustrates this state with the armature element 40 pulled toward the friction disk section 27.

If both electromagnets 28 and 29 are not supplied with current, a second take-up speed, which is lower than the first take-up speed, is transmitted to the fan impeller hub 21 via the ball bearing 22 by means of friction when the driveshaft 23 rotates.

FIG. 2 shows, by way of example, a compact friction clutch 20, in which, in addition, a damping element 42 is formed on the intermediate part 21a between the armature element 39 or spring element 41 and the base body of the fan impeller hub 21 in order to dampen load peaks, for example when engaging a clutch. In this arrangement, good utilization of space is achieved by virtue of the fact that, the space available radially above and axially adjacent to the annular flange 32 is utilized for the coupling movement between the rotor disk 25 and the fan impeller 21, in the manner of mutual interlocking of the components 21a, 32, 35, 39, 40, 41 and 42 in order to keep the axial and radial construction depths as low as possible.

LIST OF REFERENCE SYMBOLS

1 Fan clutch
2 Driveshaft
3 Rotor disk
4 Fan impeller hub
5 Screw connection
6 Electromagnetic clutch 6a Electromagnet
7 Armature disk
8 Electromagnetic clutch
8a Electromagnet
9 Armature disk
10 Intermediate ring
11 Double-ball bearing
12 Ribbed disk
12a Annular region
12b Steel ring
13 Permanent magnet
14 Eddy-current clutch
20 Friction clutch
21 Fan impeller hub
21a Intermediate part
22 Ball bearing
23 Driveshaft
24 Screw element
25 Rotor disk
26 Sleeve section
27 Friction disk section
28 Electromagnet
29 Electromagnet
30 Flange piece
31 Ball bearing
32 Annular flange
33 Annular flange
34 Ball bearing
35 Permanent magnet
36 Eddy-current clutch
37 Eddy-current part
38 Steel disk
39 Armature element
40 Armature element
41 Spring element
42 Damper element
43 Screw connection

The invention claimed is:

1. A friction clutch for a fan impeller hub comprising:
   at least a first clutch and an eddy current clutch;
   a driving flange connected directly to a drive element and having at least a first friction-disk section and a second friction-disk section;
   the first friction-disk section engagably connecting the fan impeller hub to the driving flange via the first clutch;
   the second friction-disk section engagably connecting the eddy current clutch to the driving flange, the eddy current clutch comprising an eddy-current part and a permanent magnet part which can be moved relative to the eddy-current part, the permanent magnet part is arranged in the axial direction between the fan impeller hub and the driving flange; and
   a roller bearing connecting the drive element to the fan impeller hub, the roller bearing providing a friction force,
   wherein, the fan impeller hub is driven directly by the driving flange when the first clutch is engaged, the fan impeller hub is driven to a first take-up speed when the first clutch is disengaged and the eddy current clutch is engaged, and the fan impeller hub is driven to a second take-up speed by friction force when the first clutch and eddy current clutch are disengaged.

2. The friction clutch as claimed in claim 1, wherein the eddy-current part is formed on a side of the fan impeller hub.

3. The friction clutch as claimed in claim 1, wherein the fan impeller hub and the permanent magnet part are each mounted to a drive shaft attached to the driving flange by means of a separate bearing unit, the bearings being separated from each other by an axial distance.

4. The friction clutch as claimed in claim 1, wherein at least one of the two clutches is a solenoid-operated clutch.

5. The friction clutch as claimed in claim 1, wherein the permanent magnet part comprises a cast flange part.

6. The friction clutch as claimed in claim 1, wherein the fan impeller hub comprises a cast flange part.

7. A drive arrangement for a fan impeller of a motor vehicle comprising the friction clutch of claim 1.

\* \* \* \* \*